United States Patent
Sakazume

(10) Patent No.: US 12,539,496 B2
(45) Date of Patent: Feb. 3, 2026

(54) LIQUID COMPOSITION, MEMBRANE, AND PRODUCT COMPRISING MEMBRANE

(71) Applicant: SOMAR CORPORATION, Tokyo (JP)

(72) Inventor: Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 5 days.

(21) Appl. No.: 18/264,146

(22) PCT Filed: Feb. 9, 2022

(86) PCT No.: PCT/JP2022/005000
§ 371 (c)(1),
(2) Date: Aug. 3, 2023

(87) PCT Pub. No.: WO2022/176724
PCT Pub. Date: Aug. 25, 2022

(65) Prior Publication Data
US 2024/0100484 A1    Mar. 28, 2024

(30) Foreign Application Priority Data
Feb. 16, 2021  (JP) ................. 2021-022487

(51) Int. Cl.
*B01D 67/00* (2006.01)
*B01D 71/02* (2006.01)

(52) U.S. Cl.
CPC ........ *B01D 67/0011* (2013.01); *B01D 71/021* (2013.01); *B01D 71/027* (2013.01); *B01D 2323/06* (2013.01); *B01D 2325/43* (2022.08)

(58) Field of Classification Search
CPC ............ B01D 2323/06; B01D 67/0009; B01D 67/0011; B01D 67/00111; B01D 67/00113
See application file for complete search history.

(56) References Cited

U.S. PATENT DOCUMENTS

| | | | |
|---|---|---|---|
| 11,780,987 B2 | 10/2023 | Nagahama | |
| 2018/0134862 A1* | 5/2018 | Nagahama | G02B 27/0018 |
| 2019/0010339 A1* | 1/2019 | Mitsumoto | C09D 133/14 |
| 2022/0216126 A1 | 7/2022 | Yamashita et al. | |

FOREIGN PATENT DOCUMENTS

| | | | | |
|---|---|---|---|---|
| CN | 105938295 A | 9/2016 | | |
| CN | 107614261 A | 1/2018 | | |
| JP | H04-318071 A | 11/1992 | | |
| JP | H07-034030 A | 2/1995 | | |
| JP | 2007-161829 A | 6/2007 | | |
| JP | 2008-241767 A | 10/2008 | | |
| JP | 2016161926 A | * | 9/2016 | ............... G02B 5/20 |
| JP | 2016-216631 A | 12/2016 | | |
| JP | 2018-090830 A | 6/2018 | | |
| JP | 2020-527479 A | * | 2/2020 | |
| KR | 10-2011-0109278 A | 10/2011 | | |
| KR | 10-2014-0006859 A | 1/2014 | | |
| WO | 2012/115255 A1 | 8/2012 | | |
| WO | 2021/060348 A1 | 4/2021 | | |

OTHER PUBLICATIONS

International Search Report corresponding to PCT/JP2022/005000 dated May 10, 2022, 2 pages.
Chinese Office Action dated Jan. 9, 2024, Chinese Application No. 202280015362.0, English translation included, 11 pages.
Korean Office Action dated Dec. 13, 2023, Korean Application 10-2023-7020968, English translation included, 8 pages.
U.S. Office Action dated Jul. 8, 2024, U.S. Appl. No. 18/690,312; 23 pages.

* cited by examiner

*Primary Examiner* — Ryan B Huang
(74) *Attorney, Agent, or Firm* — Rankin, Hill & Clark LLP

(57) ABSTRACT

A liquid composition which enables formation of a membrane with high designability suitable to be provided to a variety of industrial products, such as electronic devices and electronic device components, is provided. Here, (A) indicates a resin component, (B) unevenness forming particles, (B1) inorganic small particles having a particle diameter ($d_1$) of 0.05 μm or more and 0.4 μm or less, (B2) inorganic-type large particles having a particle diameter ($d_2$) of 2 μm or more and 6 μm or less, and (C) a diluent solvent. The liquid composition is for forming a membrane by spray coating and comprises at least (A), (B) and (C). The (B) is contained in an amount of 20% by mass or more and 60% by mass or less in 100% by mass of a total amount of the total solid content in the composition. The (B) contains (B1) and (B2) in an amount of 90% by mass or more. A mass ratio of (B2) to (B1):1 is 1.8 or more and 3.3 or less.

11 Claims, 1 Drawing Sheet

| | COMPONENTS | | | | EXAMPLES | | | | | | | | | | | | | | | |
|---|---|---|---|---|---|---|---|---|---|---|---|---|---|---|---|---|---|---|---|---|---|
| | | | | | 1 | 2 | 3 | 4 | 5 | 6 | 7 | 8 | 9 | 10 | 11 | 12 | 13 | 14 | 15 | 16 | 17 |
| LIQUID COMPOSITION | A | A1 | ACRYLIC RESIN | | 60 | 60 | 60 | 60 | 60 | 60 | 60 | 60 | 60 | 60 | 60 | 60 | 60 | 60 | 60 | 60 | 60 |
| | D | D1 | ISOCYANATE RESIN | | 40 | 40 | 40 | 40 | 40 | 40 | 40 | 40 | 40 | 40 | 40 | 40 | 40 | 40 | 40 | 40 | 40 |
| | B | B1 | B1a | CARBON BLACK(150nm) | 20.0 | 19.0 | 15.0 | 13.0 | 12.0 | 15.0 | 15.0 | 15.0 | 15.0 | – | 15.0 | – | 5.0 | 10.0 | 25.0 | 35.0 | 45.0 |
| | | | B1b | TRANSPARENT SILICA(58nm) | – | – | – | – | – | – | – | – | – | 15.0 | 40.0 | 15.0 | – | – | – | – | – |
| | | B2 | B2a | COMPLEX SILICA(3μm) | 35.0 | 36.0 | 40.0 | 42.0 | 43.0 | – | – | – | – | 40.0 | – | 40.0 | 16.0 | 19.0 | 40.0 | 80.0 | 120.0 |
| | | | B2b | BLACK ACRYLIC BEADS(3μm) | – | – | – | – | – | 40.0 | – | – | – | – | – | – | – | – | – | – | – |
| | | | B2c | TRANSPARENT SILICA(4.1μm) | – | – | – | – | – | – | 40.0 | – | – | – | – | – | – | – | – | – | – |
| | | | B2d | TRANSPARENT SILICA(8μm) | – | – | – | – | – | – | – | 40.0 | – | – | – | – | – | – | – | – | – |
| | | | B2e | TRANSPARENT ACRYLIC BEADS(3μm) | – | – | – | – | – | – | – | – | 40.0 | – | – | – | – | – | – | – | – |
| | ※B1:B2 = 1 : ● (MASS RATIO) | | | | 1.75 | 1.89 | 2.67 | 3.23 | 3.58 | 2.67 | 2.67 | 2.67 | 2.67 | 2.67 | 2.67 | 2.67 | 3.20 | 1.90 | 2.67 | 2.29 | 2.57 |
| | ※(A+D):B = 100 : ● (MASS RATIO) | | | | 35.5 | 35.5 | 35.5 | 35.5 | 35.5 | 35.5 | 35.5 | 35.5 | 35.5 | 35.5 | 35.5 | 35.5 | 17.4 | 22.5 | 46.5 | 53.5 | 62.3 |
| PROPERTY EVALUATION | LIQUID | VISCOSITY (mPa·s) | | | × | ○ | ○ | ○ | ○ | ○ | ○ | ○ | ○ | ○ | ○ | ○ | ○ | ○ | ○ | ○ | × |
| | | INJECTION PERFORMANCE | | | ○ | ○ | ○ | ○ | ◎ | ○ | ○ | ○ | ○ | ○ | × | ○ | ○ | ○ | ○ | ○ | ○ |
| | | COATING PERFORMANCE | | | × | ○ | ◎ | ○ | ○ | × | × | × | × | ○ | × | × | × | ○ | ○ | ○ | ○ |
| | | LIQUID DRIPPING PROPERTY | | | ○ | ○ | ◎ | ○ | × | ○ | ○ | ○ | ○ | ○ | ○ | ○ | × | ○ | ○ | ○ | ○ |
| | MEMBRANE CHARACTERISTICS | GLOSSINESS (specular glossiness at 60°) | | | × | ○ | ◎ | ○ | ○ | ○ | ○ | ○ | ○ | ○ | ○ | ○ | × | ○ | ○ | ○ | ○ |
| | | REFLECTANCE (550nmREFLECTANCE) | | | ○ | ○ | ◎ | ○ | ○ | ○ | ○ | ○ | ○ | ○ | × | ○ | × | ○ | ○ | ○ | ○ |
| | | L VALUE(L*VALUE IN CIELAB COLOR SPACE SYSTEM) | | | ○ | ○ | ◎ | ○ | ○ | ○ | ○ | ○ | ○ | ○ | ○ | × | × | ○ | ○ | ○ | ○ |
| | | LIGHT-SHIELDING PROPERTY | | | ○ | ○ | ◎ | ○ | ○ | ○ | ○ | ○ | ○ | ○ | × | ○ | × | ○ | ○ | ○ | ○ |
| | | ADHESIVENESS | | | × | ○ | ◎ | ○ | ○ | ○ | ○ | ○ | ○ | ○ | × | × | × | ○ | ○ | ○ | × |
| | | ※COMPREHENSIVE EVALUATION | | | ○ | ○ | ◎ | ○ | ○ | ○ | ○ | ○ | ○ | ○ | ○ | ○ | ○ | ○ | ○ | ○ | ○ |
| | MEMBRANE SURFACE PROPERTIES | Rz | | | × | ○ | ◎ | ○ | ○ | ○ | ○ | ○ | ○ | ○ | × | ○ | × | ○ | ◎ | ◎ | ◎ |
| | | Rsm | | | ○ | ○ | ◎ | ○ | ○ | ○ | ○ | ○ | ○ | ○ | × | × | × | ○ | ◎ | ◎ | ◎ |
| | | Rsk | | | × | ○ | ◎ | ○ | ○ | ○ | ○ | ○ | ○ | ○ | × | ○ | × | ○ | ◎ | ◎ | ◎ |
| | | Rku | | | ○ | ○ | ◎ | ○ | ○ | ○ | ○ | ○ | ○ | ○ | × | × | × | ○ | ◎ | ◎ | ◎ |
| | | Ra | | | ○ | ○ | ◎ | ○ | ○ | ○ | ○ | ○ | ○ | ○ | ○ | ○ | × | ○ | ◎ | ◎ | ◎ |

…

LIQUID COMPOSITION, MEMBRANE, AND PRODUCT COMPRISING MEMBRANE

This application is a U.S. national phase filing under 35 U.S.C. § 371 of PCT Application. No. PCT/JP2022/005000, filed on Feb. 9, 2022, which is hereby incorporated by reference in its entirely by reference.

TECHNICAL FIELD

The present invention relates to a liquid composition, a membrane, and products comprising the membrane. Specifically, it relates to a liquid composition for forming a membrane, a membrane formed from the composition, and products comprising the membrane on its surface to be coated.

BACKGROUND ART

In electronic devices, such as a smartphone, tablet and personal computer, a black membrane is sometimes provided to a part or all of its chasses (regardless of an outer surface or inner surface) and a part of a not-viewed surface (e.g. a frame part) of a cover glass to be arranged and fixed to a viewing-surface side of a tough panel for the purpose of enhancing designability thereof, hiding its internal wiring, etc. and blocking lights, etc. In recent years, such demand is also found in a part (e.g. an outer frame of a lens) or all of electronic device components, such as a lens mounted on a variety of camera units.

The patent document 1, for example, discloses a technique of forming a membrane by screen printing of an insulation material directly thereon or by in-mold molding to obtain a membrane-forming film having screen printing thereon.

RELATED ART DOCUMENTS

Patent Document

Patent Document 1: Japanese Patent Unexamined Patent Publication (Kokai) No. 2007-285093

SUMMARY OF THE DISCLOSED SUBJECT MATTER

However, along with demands on enhancing designability in industrial products, there are more demands for providing a black membrane with higher designability (e.g. an uneven membrane) to those products.

The present invention was made in consideration with the circumstances above. The present invention has an object thereof to provide a liquid composition capable of forming a membrane with high designability, which is suitable to be provided to a variety of industrial products, such as electronic devices and electronic device components.

The present inventors conducted studies diligently and found that fulfilling the requirements below is effective to form a membrane with high designability.

To use a spray method as a membrane forming method (coating method)

A liquid composition to be used for forming a membrane has a specific composition (comprising a predetermined ratio of unevenness forming particles comprising, in a range of a predetermined mass ratio, large and small inorganic particles having particle diameters in predetermined ranges).

Based on these newly acquired knowledge, the present inventors completed the invention as provided below and attained the object above.

Below, (A) indicates a resin component, (B) unevenness forming particles, (B1) inorganic small particles having a particle diameter ($d_1$) of 0.05 μm or more and 0.4 μm or less, (B2) inorganic large particles having a particle diameter ($d_2$) of 2 μm or more and 6 μm or less, and (C) diluent solvent.

According to the present invention, there is provided a composition for forming a membrane by spray coating, comprising at least (A), (B) and (C): wherein
 (B) is contained in an amount of 20% by mass or more and 60% by mass or less in a total amount of 100% by mass of all solid content in the composition;
 (B) comprises (B1) and (B2) in an amount of 90% by mass or more, and a mass ratio of (B2) with respect to (B1):1 is 1.8 or more and 3.3 or less.

The liquid composition above may include modes below.
 The (B2) preferably contains silica.
 Silica preferably includes complex silica colored black with a colorant.
 The (B1) preferably contains carbon black.
 Viscosity at 25° C. is preferably 1 mPa·s or more and 30 mPa·s or less.

According to the present invention, there is provided a membrane by spray coating formed from the composition above. According to the present invention, a product having the membrane above is provided.

The product above may include modes below.
 It is preferable that an outermost surface of a plane formed with a membrane has glossiness of less than 2% against an incident light with an incident angle of 60° (hereinafter, also simply referred to as "glossiness"), reflectance of 4% or less against a light having a wavelength of 550 nm (hereinafter, also simply referred to as "reflectance"), and an L value in CIELAB color space system in SCE method is 22 or less.
 It is preferable that an outermost surface of a plane formed with a membrane has optical density of 1.5 or more in the case where a light-shielding characteristic when transmitting a light is required to the membrane.
 It is preferable that an outermost surface of a plane formed with a membrane has a maximum height Rz of 7 μm or more based on JIS B0601:2001 (hereinafter, also simply referred to as "Rz"), an average length Rsm of contour curve elements (hereinafter, also simply referred to as "Rsm") of 80 μm or more, a skewness Rsk of a contour curve (hereinafter, also simply referred to as "Rsk") of 0.3 or less, and Kurtosis of a contour curve ((hereinafter, also simply referred to as "Rku") of 3 or more.

According to the present invention, there is provided a liquid composition capable of forming a membrane having high designability suitable to be provided to a variety of industrial products, such as electronic devices and electronic device components.

DESCRIPTION OF DRAWINGS

FIG. 1 is a Table showing exemplary liquid compositions and associated property evaluations.

EXEMPLARY MODE FOR CARRYING OUT THE DISCLOSED SUBJECT MATTER

Below, the best modes for carrying out the invention will be explained, however, the present invention is not limited to the modes below and also includes those obtained by suitably modifying or improving the modes explained below based on ordinary knowledge of persons skilled in the art within the scope of the present invention.

As to a range of value in the present specification, an uppermost value or a lowermost value described in certain value ranges may be replaced by values indicated in the examples.

In the present specification, when there are a plurality of kinds of substances falling under each component in a composition, a content ratio or a content in each component in the composition indicates a content ratio or a content of a total of the plurality of kinds of substances being in the composition unless otherwise mentioned.

<Liquid Composition>

A liquid composition according to one mode of the present invention (hereinafter, also referred to as "a composition") is used for forming a membrane on a surface of an object to be coated and comprises (A) a resin component, (B) unevenness forming particles and (C) a diluent solvent. The (B) used for forming a composition comprises (B1) small particles having a particle diameter ($d_1$) of 0.05 μm or more and 0.4 μm or less and (B2) large particles having a particle diameter ($d_2$) of 2 μm or more and 6 μm or less, and it may also comprise components other than (B1) and (B2). Namely, a composition according to one mode of the present invention is configured by comprising (A), (B1), (B2) and (C). A composition according to one mode may be used suitably in spray coating when applying to a surface of an object to be coated.

Below, details of a composition according to one mode of the present invention will be explained.

—(A)—

(A) to be used for forming a composition serves as a binder of (B). A material of (A) is not particularly limited and either of a thermoplastic resin and thermosetting resin may be used. As a thermosetting resin, for example, an acrylic-type resin, urethane-type resin, phenol-type resin, melamine-type resin, a urea-type resin, diallyl phthalate-type resin, unsaturated polyester-type resin, epoxy-type resin and alkyd-type resin, etc. may be mentioned. As a thermoplastic resin, a polyacrylic ester resin, polyvinyl chloride resin, butyral resin and styrene-butadiene copolymer resin, etc. may be mentioned. In terms of heat resistance, moisture resistance, solvent resistance and surface hardness of an uneven membrane to be formed, a thermosetting resin is preferably used as (A). As a thermosetting resin, when considering flexibility and strength of a membrane to be formed, an acrylic resin is particularly preferable. As (A), one kind may be used alone or two or more kinds may be combined for use.

A content (a total amount) of (A) is not particularly limited, however, when considering a blending balance with other components, it is preferably 5% by mass or more, more preferably 15% by mass or more, furthermore preferably 25% by mass or more and preferably 50% by mass or less, more preferably 45% by mass or less and furthermore preferably 40% by mass or less with respect to a total amount (100% by mass) of total solid content in the composition.

—(B)—

It is essential that the (B) to be used for forming a composition comprises a plurality of unevenness forming particles having different sizes in combination. Particularly, it is characteristic that (B1) small particles and (B2) large particles are combined to be used as (B). For example, in the case of composing (B) only of two kinds of unevenness forming particles having different sizes (namely, (B1) and (B2)), a particle diameter ($d_2$) of (B2) is preferably 10 times or more, more preferably 15 times or more a particle diameter ($d_1$) of (B1) and preferably 40 times or less and more preferably 35 times or less. When using as (B) three or more kinds of unevenness forming particles having different sizes, a particle diameter ($d_{max}$) of unevenness forming particles with a maximum particle diameter and a particle diameter ($d_{min}$) of unevenness forming particles with a minimum particle diameter may be adjusted to have the relationship above (namely, ($d_{max}$) is preferably 10 times or more, more preferably 15 times or more the size of ($d_{min}$) and preferably 40 times or less and more preferably 35 times or less the size of ($d_{min}$)).

In one mode, ($d_1$) is preferably 0.05 μm or more, more preferably 0.1 μm or more and preferably 0.4 μm or less and more preferably 0.3 μm or less. ($d_2$) is preferably 2 μm or more, more preferably 3 μm or more and preferably 6 μm or less, more preferably 5 μm or less and furthermore preferably 4 μm or less.

A particle diameter ($d_1$) of (B1) and a particle diameter ($d_2$) of (B2) are a median diameter based on volume measured by a laser diffraction/scattering particle size distribution measuring apparatus.

In one mode, a mass ratio of (B2) in (B) is, with respect to (B1):1, preferably 1.5 or more, more preferably 1.8 or more and preferably 3.5 or less and more preferably 3.3 or less. The present inventors found that by using (B1) and (B2) having the specific ranges of particle diameters as explained above combined in a range of this mass ratio, one particle (B1) is easily buried between adjacent two particles (B2) in a membrane to be formed. As a result, low glossiness and low reflectivity on the membrane surface can be realized and a degree of blackness becomes high (an L value becomes low).

A total content (total amount) of (B1) and (B2) in (B) is preferably 90% by mass and more preferably 95% by mass. An upper limit thereof is not particularly limited and is 100% by mass. Namely, in one mode, (B1) and (B2) may be contained preferably 90% by mass or more in 100% by mass of (B).

A content (total amount) of (B) with respect to a total amount (100% by mass) of total solid content in the composition is preferably 20% by mass or more, more preferably 25% by mass or more, furthermore preferably 30% by mass or more and preferably 60% by mass or less, more preferably 50% by mass, furthermore preferably 45% by mass or less and particularly preferably 40% by mass. When a total amount of (B) is less than 20% by mass, disadvantages of an increase of glossiness and optical density shortage are caused, while when exceeding 60% by mass, (A) in a formed coating film is decreased relatively, which results in a disadvantage that a coating film falls off from an object to be coated.

As (B2), either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and carbon, etc. may be mentioned. They may be used alone or in combination of two or more kinds.

To obtain more excellent characteristics, it is preferable to use inorganic-type particles as (B2). By using inorganic-type particles as (B2), a lower glossy and high light-shielding membrane can be formed easily. As inorganic-type particles to be used as (B2), silica is preferable. A shape of (B2) is not particularly limited but it is preferable to use particles having a narrow particle distribution having a CV (Coefficient of Variation) value of, for example, 15 or less (a sharp product) to realize lower glossiness, lower reflectiveness and a lower L value on a membrane surface to be formed. The CV value is a numerically expressed degree of spread of a particle diameter distribution (variation of particle diameters) with respect to an average value of a particle diameter (calculated average particle diameter). When using a particle as above, a chance of contacting between (B2) and (B1) increases in a membrane to be formed so as to realize furthermore lower glossiness, lower reflectiveness and a lower L value on the membrane surface.

Also, in order to decrease glossiness on the membrane surface to be formed, a particle in indefinite form as (B2) is preferably used. It is particularly preferable to use a porous indefinite-shaped silica particle as (B2). When using particles as above as (B2), lights refract repeatedly inside and surface when formed into a membrane, consequently, a glossiness on the membrane surface can be furthermore reduced.

In one mode, in order to suppress reflection of lights on a surface of a membrane to be formed, (B2) may be colored black by using an organic-type or inorganic-type colorant. As a material therefor, composite silica, conductive silica and black silica, etc. may be mentioned.

As composite silica, for example, what obtained by synthesizing carbon black (hereinafter, also simply referred to as "CB") and silica at a nano level and composing may be mentioned. As conductive silica, for example, what obtained by coating silica particles with conductive particles, such as CB, may be mentioned. As black silica, for example, natural ore containing graphite in silica may be mentioned.

As well as (B2), material of (B1) is not particularly limited and either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and CB, etc. may be mentioned. They may be used alone or in combination of two or more kinds.

As (B1), for example, CB added as a colorant/conductive agent may be also used. When using CB as (B1), a membrane to be formed is colored, so that an effect of reflection prevention is increased furthermore and a preferable antistatic effect can be obtained.

—(C)—

The (C) used for forming a composition is contained for the purpose of dissolving (A) and adjusting viscosity of the whole composition. When using (C), (A) and other component to be added as needed can be mixed more easily and uniformity of the composition is improved. Also, viscosity of the composition can be adjusted properly, so that, when forming a membrane on a surface of an object to be coated, operability of the composition and uniformity of a thickness when applying can be improved. As a result, it can contribute largely to enhance designability of a finally obtained product.

As (C), it is not particularly limited as long as it is a solvent capable of dissolving (A), and an organic solvent or water may be mentioned. As an organic solvent, for example, methylethylketone, toluene, propylene glycol monomethyl ether acetate, ethyl acetate, butyl acetate, methanol, ethanol, isopropyl alcohol and butanol, etc. may be used. They may be used alone or in combination of two or more kinds.

A content (total amount) of (C) in a composition is, with respect to 100 parts by mass of (A), preferably 1 part by mass or more, more preferably 3 parts by mass or more and preferably 20 parts by mass or less in order to obtain the effects of containing (C) as explained above.

—(D) Optional Component—

Other than the components (A), (B) and (C) above, the composition may contain (D) to an extent of not hindering the effects of the present invention. As (D), for example, a leveling agent, thickener, pH adjusting agent, lubricant, dispersant, defoaming agent, curing agent and reaction catalyst, etc. may be mentioned.

Particularly when using a thermosetting resin as (A), crosslinking of (A) can be accelerated by blending a curing agent. As a curing agent, a urea compound having a functional group, melamine compound, isocyanate compound, epoxy compound, aziridine compound and oxazoline compound, etc. may be mentioned. As a curing agent, isocyanate compound is preferable among them. The curing agent may be used alone or in combination of two or more kinds.

A ratio of blending a curing agent in a composition is, with respect to 100 parts by mass of (A), preferably 10 parts by mass or more and 50 parts by mass or less. When adding a curing agent in this range, hardness of a membrane to be formed is enhanced, consequently, characteristics of the membrane surface can be maintained for a long term even when the membrane is exposed to an environment of rubbing against other member, and low glossiness, a high light-shielding characteristic, low reflectiveness and high degree of blackness can be maintained easily.

When a curing agent is contained in a composition, a reaction catalyst may be used together so as to accelerate reaction of the curing agent with (A). As a reaction catalyst, for example, ammonia and aluminum chloride, etc. may be mentioned. A ratio of a reaction catalyst to be contained in the composition is, with respect to 100 parts by mass of a curing agent, preferably 0.1 part by mass or more and 10 parts by mass or less.

A composition according to one mode has viscosity at 25° C. of preferably 1 mPa·s or more, preferably 30 mPa·s or less and more preferably 20 mPa·s or less for the reason of coating by using a spray (spray coating) while maintaining smoothness of the composition on a surface of an object to be coated. When viscosity of the composition is too low, there is a possibility of not being able to form a membrane having a thickness sufficient to realize better designability. When viscosity of the composition is too high, it becomes difficult to spray the composition uniformly on a surface of an object to be coated, so that there is a possibility that a membrane having a uniform thickness with better designability cannot be obtained.

The viscosity differs depending on components contained in the composition, that is, kinds and molecular weights, etc. of (A) and (B) to be used. Also, when blending (D) in addition to the (A) and (B) above, it differs depending on a kind and molecular weight, etc. of (D). However, it can be adjusted easily by adjusting an amount of (C) in the composition in the range stated above.

A composition according to one mode of the present invention may be prepared (produced) by adding (A), (B) and, when needed, (D) to (C), and mixing and agitating. An order of mixing the respective components is not particularly limited as long as the components are mixed uniformly.

A composition according to one mode of the present invention may be one-liquid type or two-liquid type. When containing a curing agent as (D) in the composition, the composition according to one mode may be two-liquid type with, for example, a first liquid comprising components other than a curing agent and a second liquid comprising a curing agent.

<Coating Method, Membrane and Product>

A composition according to one mode of the present invention may be used for forming a membrane. Also, products provided with the membrane may be produced.

A method of forming a membrane is not particularly limited. A membrane may be formed on any object to be coated by any method or by an apparatus, for example, spray coating (for example, air spray, airless spray and electrostatic spray, etc.), paint brush, curtain flow coating, roller brush coating, bar coating, kiss roll, metaling bar, gravure roll, reverse roll, dip coating and die coating may be used.

Particularly, a composition according to one mode preferably forms a membrane by using spray coating, which requires spray of droplet from a small spray hole. In other words, a composition according to one mode is a composition for forming a membrane by using spray coating, and a membrane to be formed is a spray coated membrane.

According to spray coating using a composition according to one mode, droplets of the composition adhere successively to a surface of an object to be coated and, at the same time, volatilization of (C) in the droplets adhered to the object to be coated proceeds. As a result, a solid content (particles) obtained by removing (C) from droplets laminates successively on the surface of the object to be coated so as to form a solid particle laminate. According to one mode, this solid particle laminate configures a membrane.

In the case of using a composition comprising a thermosetting resin as (A) and furthermore comprising a curable agent as (D), it is preferable that a solid particle laminate is applied to a surface of an object to be coated and, after that, the laminate is heated to be cured. Here, even if a trace of (C) remains in the preheated laminate, it volatilizes completely by the heating.

Heating condition may be adjusted properly depending on a thickness of the preheat laminate and heat resistant characteristic of an object to be coated, etc. The heating condition is, for example, one minute or more and 10 minutes or less at 70° C. or more and 150° C. or less, and preferably 2 minutes or more and 5 minutes or less at 100° C. or more and 130° C. or less.

An object to be coated with a composition according to one mode of the present invention is not particularly limited as long as the object has a hard surface made of, for example, glass, a resin, metal, ceramic and wood, etc. A shape of the object to be coated is not particularly limited and a plate shape, (hollow) cylindrical shape and film shape, etc. may be mentioned.

As an object to be coated, the followings may be mentioned as examples.

electric/electronic devices, such as a cellular phone, smart phone, tablet, personal computer, peripheral appliances of personal computer (a keyboard, printer and external drive, etc.), watch, audio appliances, and a variety of office automation apparatuses.

home electric appliances, such as a refrigerator, vacuum cleaner, microwave, television, and recording appliances furniture and wooden products, such as stairs, floor, table, and closet a variety of building materials, such as flooring, and inner wall/outer wall of building vehicles, such as automobiles and motorcycles, and components thereof: specifically, body of vehicle, interiors (a meter panel, dashboard and handle, etc.), bumper, spoiler, doorknob, headlight, taillight, aluminum wheel, and gasoline tank of motorcycle, etc.

optical use, such as lens and other optical components to be mounted to a variety of camera units glasses, goggles and other similar products In the present specification, a product indicates an object, on which a membrane formed by a composition according to one mode of the present invention is formed directly or formed on an anchor layer formed in advance.

As an anchor layer, for example, a urea-type resin layer, melamine-type resin layer, urethane-type resin layer and polyester-type resin, etc. may be mentioned. For example, a urethane-type resin layer is obtained by applying a solution comprising an active hydrogen-containing compound, such as polyisocyanate, diamine and diol, to a surface of an object to be coated and curing. A urea-type resin and a melamine-type resin may be obtained by applying a solution comprising an aqueous urea-type resin or aqueous melamine-type resin to a surface of an object to be coated and curing. A polyester-type resin may be obtained by applying a solution dissolved in or diluted by an organic solvent (methylethyl ketone and toluene, etc.) to a surface of an object to be coated and drying.

Note that a membrane formed from a composition according to one mode may be once formed on other object (for example, a plastic film, etc.) than an object to be coated, and the membrane together with the other object may be put on the object to be coated, so that the membrane of the composition according to one mode may be provided to a surface of a product.

A thickness of a membrane formed from a composition according to one mode is not particularly limited and may be adjusted properly in accordance with a use purpose, etc. of the product. An average thickness of the membrane is a height including parts protruding, due to (B2) and (B1) in the membrane, from a surface of an object to be coated. An average thickness of a membrane can be measured by a method based on JIS K7130.

<Characteristics of Membrane>

Characteristics of a membrane formed from a composition according to one mode are as below.

(Glossiness, Reflectance, L Value, Optical Density and Adhesiveness)

A surface of a membrane formed from a composition according to one mode preferably has glossiness of less than 2%, reflectance of 4% or less and an L value of 22 or less. In the case where a light-shielding characteristic when transmitting light is required, it is furthermore preferable that an optical density on the membrane surface is 1.5 or more in addition to the above characteristics (glossiness less than 2%, reflectance 4% or less and L value 22 or less).

Here, when configured that a membrane formed from a composition according to one mode is exposed as an outermost surface, glossiness, reflectance, an L value and optical density on a real surface of the membrane are preferably in the ranges as above. On the other hand, when another membrane is coated on a membrane formed from a composition according to one mode, glossiness, reflectance, an L value and optical density on a surface of this another membrane (that is, an outermost surface of the product) are preferably in the ranges as above. Hereinafter, these surfaces will be referred to as "an outermost surface of a membrane".

An outermost surface of a membrane formed from a composition according to one mode preferably has glossiness of less than 2%, reflectance 4% or less and an L value 22 or less. In the case where a light-shielding characteristic when transmitting light is required, it is furthermore preferable that an optical density on the outermost surface of the membrane is 1.5 or more in addition to the above characteristics (glossiness less than 2%, reflectance 4% or less and an L value 22 or less). When glossiness, reflectance, an L value and optical density on an outermost surface of a membrane are in the ranges as above, it is possible to attain low glossiness, low reflectance, a high blackness degree and a high light-shielding characteristic on the outermost surface of the membrane.

The uppermost value of glossiness is more preferably less than 1.5% and furthermore preferably less than 1%. When glossiness is adjusted to be in the range above, a flare ghost phenomenon due to irregular reflection of lights can be prevented effectively. A lower limit value of glossiness is not particularly limited, and the lower the better.

An uppermost value of reflectance is more preferably 3% or less and furthermore preferably 2.5% or less. A lower limit value of reflectance is not particularly limited. The lower the reflectance is, the better. When reflectance is adjusted to be in the range above, a flare ghost phenomenon due to irregular reflection of lights can be prevented furthermore effectively.

An uppermost value of an L value (blackness degree) is more preferably 20 or less and furthermore preferably 18 or less. A lower limit value of an L value is not particularly limited. However, in terms of demands for real blackness on appearance, the lower, the better. When an L value is adjusted to be in the range above, the blackness is enhanced and blackness outstands so as to attain excellent designability, therefore, it can be preferably used as a camera unit for smartphones and other cellular phones.

The L value above is a lightness L*value on an outermost surface of a membrane, which is in CIE 1976 L*a*b* (CIELAB) color space system based on a SCE method. The SCE method is a specularly reflected light removal method, which means a method of measuring color by removing specularly reflected lights. Definition of the SCE method is defined in JIS Z8722 (2009). Since specularly reflected lights are removed in the SCE method, the color is close to the color actually viewed by human.

CIE is abbreviation of Commission Internationale de l'Eclairage, which means international committee on illumination. The CIELAB color space was adopted in 1976 in order to measure color difference between perception and devices and is a uniform color space defined in JIS Z 8781 (2013). Three coordinates in CIELAB are indicated by L*value, a*value and b*value. The L*value indicates lightness and expressed from 0 to 100. When L*value is 0, it indicates black, while it indicates white diffusion color when L*value is 100. The a*value indicates colors between red and green. When a*value is in minus, it indicates colors close to green, while when in plus, it indicates colors close to red. The b*value indicates colors between yellow and blue. When b*value is in minus, it indicates colors close to blue, while it indicates colors close to yellow when in plus.

A lower limit value of optical density in the case, where a light-shielding characteristic when transmitting light is required to a membrane formed from a composition, is more preferably 2 or more and furthermore preferably 2.5 or more. When optical density is adjusted to be in the range above, a light-shielding characteristic can be enhanced furthermore. An upper limit value of optical density is not particularly limited, and the higher the better.

The glossiness, reflectance, an L value and optical density explained above can be measured by methods explained later on.

In addition to the characteristics (glossiness, reflectance, an L value and, when necessary, optical density) above, a membrane formed from a composition preferably has good adhesiveness to a surface of an object to be coated. Adhesiveness of a membrane formed from a composition to a surface of an object to be coated preferably satisfies that 75% or more of the coating remain as explained in adhesiveness evaluation in later-explained examples.

(Rz, Rsm, Rsk, Rku and Ra)

In a membrane formed from a composition according to one mode, it is preferable that a maximum height Rz is 7 μm or more, an average length Rsm of contour curve element is 80 μm or more, skewness Rsk of contour curve is 0.3 or less and Kurtosis Rku of a contour curve is 3 or more. When Rz, Rsm, Rsk and Rku are in the ranges above on the uppermost surface, glossiness, optical density, reflectance and an L value on the outermost surface of a membrane can become in the ranges above (glossiness less than 2%, reflectance 4% or less and an L value 22 or less), consequently, low glossiness, low reflectance, a high blackness degree and, as needed, a high light-shielding characteristic on the outermost surface of a membrane can be attained.

The lower limit value of Rz is more preferably 10 μm or more. When the lower limit value of Rz is as above, low glossiness, low reflectance and high light-shielding characteristic can be adjusted furthermore easily.

An upper limit value of Rz is not particularly limited but is preferably 50 μm or less and more preferably 30 μm or less. When an upper limit value of Rz is as above, furthermore lower glossiness, a higher light-shielding characteristic, lower reflectance and higher blackness on the outermost surface of a membrane can be attained easily.

The Rsm indicates an average length of the contour curve elements within the standard length. A lower limit value of Rsm is more preferably 100 μm or more and furthermore preferably 120 μm or more. When a lower limit value of Rsm is as above, an advantage of low glossiness can be attained furthermore easily. An upper limit value of Rsm is not particularly limited, but preferably 160 μm or less. In this range, furthermore excellent adhesiveness between an object to be coated and a membrane to be formed thereon can be obtained.

The Rsk is an average of the cubes of a height Z(x) in a dimentionless reference length obtained by a root mean square height (Zq) cubed, which is an index indicating deviation from an average line of uneven shape, that is, a degree of strain, on an outermost surface of a membrane. There is a tendency that when Rsk value is in plus (Rsk>0), the uneven shape is deviated to the concave side, so that protruding shape becomes sharp. On the other hand, when in minus (Rsk<0), the uneven shape is deviated to the convex side, so that protruding shape becomes dull. When the protruding shape of contour curve is dull, haze becomes low comparing with the case with a sharp shape.

An upper limit value of Rsk is more preferably 0.2 or less. When an upper limit value of Rsk is as above, an advantage of low glossiness can be obtained furthermore easily. A lower limit value of Rsk is not particularly limited but is preferably 0 or more. When a lower limit value of Rsk is as above, an advantage of low glossiness can be obtained easily.

The Rku indicates an average of the fourth-power of a height Z(x) in a dimentionless reference length obtained by the four-power of a root-mean-square height (Zq), and is an index indicating a degree of sharpness at tips of unevenness on an outermost surface of a membrane. When Rku is larger, there are more sharp tips on unevenness, so that an inclined angle close to tips of unevenness becomes larger while inclined angles of other parts become smaller, so that reflection of background tends to arise.

A lower limit value of Rku is more preferably 3.3 or more. When a lower limit value of Rku is as above, an advantage of low glossiness can be obtained more easily. An upper limit value of Rku is not particularly limited, but is preferably 5 or less. When an upper limit value of Rku is as above, an advantage of low glossiness can be obtained more easily.

In a membrane formed from a composition according to one mode, an arithmetic average roughness (Ra) on an outermost surface is preferably 0.5 μm or more, more preferably 1.0 μm or more and furthermore preferably 1.5 μm or more.

Those Rz, Rsm, Rsk, Rku and Ra on an outermost surface of a membrane as explained above can be measured or calculated based on JIS B0601:2001.

EXAMPLES

Below, the present invention will be explained specifically based on examples (including modes and comparative examples), however, the present invention is not limited to the examples. Below, "part" indicates "part by mass" and "%" indicates "% by mass".

[Components of Composition]

As A (a resin component), a substance below was prepared.

A1: thermosetting acrylic resin
(ACRYDIC A-801 PRODUCED BY DIC, solid content 50%)

As B1 (small particles) falling under B (unevenness forming particles), substances below were prepared.

B1a: carbon black (CB) (particle diameter 150 nm)
(MI-II Black #273 produced by MIKUNI Color Ltd., CB content 9.5%)

B1b: transparent silica (particle diameter 58 nm)
(ACEMATT R972 produced by EVONIK)

As B2 (large particles) falling under B, substances below were prepared.

B2a: composite silica (particle diameter 3 μm)
(BECSIA ID produced by Fuji Silysia Chemical Ltd.)

B2b: black acrylic beads (particle diameter 3 μm)
(RUBCOULEUR 224SMD black produced by Dainichiseika Color & Chemicals Mfg Co., Ltd.)

B2c: transparent silica (particle diameter 4.1 μm)
(SYLYSIA 430 produced by Fuji Silysia Chemical Ltd.)

B2d: transparent silica (particle diameter 8 μm)
(SYLYSIA 450 produced by Fuji Silysia Chemical Ltd.)

B2e: transparent acrylic beads (particle diameter 3 μm)
(ENEOS Uni-Powder NMB-0320C produced by JX Nippon Oil & Energy Corporation)

Note that BECSIAID used as B2a (complex silica) is complex particles of CB and silica, wherein CB/silica=about 25/75 (mass ratio). The MI-II black #273 used as B1a (CB) is a CB dispersant and, in a solid content total amount 18% of the dispersant, 9.5% is CB and remaining 8.5% is other compounds. In the 8.5% of remaining compounds, 3% is a copper compound and 5.5% is an acrylic resin.

As D (optional component), a substance below was prepared.

D1: isocyanate compound
(TAKENATE D110N produced by Mitsui Chemicals, Inc., solid content 75%)

[Object to be Coated]

As an object to be coated, a chassis (an external box made of plastic) of a smart phone was prepared.

Examples 1 to 16

1. Preparation of Compound

Respective components for each example with each solid content ratio shown in the Table of FIG. 1 were prepared, so that a total solid content becomes approximately 25% by mass, and added to a necessary amount of (C) a diluent solvent, which is a mixed solvent (methylethyl ketone: butyl acetate=50:50), and agitated to mix, and a liquid composition (hereinafter, also simply referred to as "a liquid") was prepared.

2. Production of Product (Sample for Evaluation)

Each liquid obtained for each of the examples was sprayed toward an outer surface of an object to be coated by spray coating in the same method as explained in (3-3) Coating Performance below. Then, the resultant was heated at 120° C. for 3 minutes to dry, a solid particle laminate was formed by spray coating and heated to be a coating (hereinafter, also simply referred to as "a coating") having an average membrane thickness of 20 μm on a surface of the object to be coated, so that a product was obtained.

3. Evaluation

On each liquid obtained in each of the examples, a variety of characteristics (viscosity, injection performance, coating performance and liquid dripping characteristic) were evaluated (liquid evaluation) in the methods explained below.

[Liquid Evaluation]

(3-1) Viscosity

Viscosity of each liquid was measured by using an E-type viscometer (VISCOMETER TV-35 produced by TOKISANGYO) under a condition of 1 rpm with a standard cone rotor with a rotor code:01 for one minute at 25° C. Evaluation reference is as below.

○: Viscosity was 1 mPa·s or more and 30 Pa·s or less. (preferable viscosity)

X: Viscosity exceeded 30 Pa·s. (excessively high viscosity)

(3-2) Injection Performance

Injection performance was evaluated by observing a state of injecting the liquid to an air spray.

An air spray, wherein an air brush (Spray-Work HG Single Airbrush produced by TAMIYA, Inc.) was attached to an air can (Spray-Work Air Can 420D produced by TAMIYA, Inc.), was used and a state that each liquid enters from a cup of an air brush to a nozzle was observed visually and injection performance was evaluated. Evaluation reference is as below.

○: A liquid entered smoothly to the nozzle with no clogging.

Δ: There was no clogging but speed of the liquid entering to the nozzle was a little slow.

X: A liquid clogged and did not enter the nozzle.

(3-3) Coating Performance

Coating performance of a liquid was evaluated by observing coating uniformity after spray coating.

Each liquid was poured into an air spray used in (3-2) above, sprayed toward an outer surface of an object to be coated for 10 seconds from a 10 cm distance from a tip of the air brush, and a formed solid particle laminate was evaluated its coating uniformity visually. Evaluation reference is as below.
- ○: Lack of coating uniformity (lack of uniformity in thickness) was not observed.
- Δ: Lack of coating uniformity was observed partially.
- X: Lack of coating uniformity was observed in many areas.

(3-4) Liquid Dripping Characteristic

Liquid dripping characteristic of a liquid was evaluated by observing liquid dripping from an object to be coated after coating by spray.

In the same way as in (3-3) above, each liquid was poured into the air spray used in (3-2) above, and after spraying toward an outer surface of an object to be coated for 10 seconds from a 10 cm distance from a tip of the air brush, liquid dripping characteristic of adhered droplet from the object to be coated was evaluated. Evaluation reference is as below.
- ○: Even when a coated object was placed vertically, there was no dripping.
- Δ: When a coated object was placed vertically, the liquid dripped gradually.
- X: When a coated object was placed vertically, the liquid dripped immediately.

[Product Evaluation]

(3-5) Characteristics

—Glossiness—

Glossiness against a measurement light having an incident angle of 60° (specular glossiness at 60°) on a surface of a coating formed on each product was measured on 9 spots by using a glossmeter (VG 7000 produced by NIPPON DENSHOKU Industries Co., Ltd.) by the method based on JIS Z8741, and an average value thereof was adopted as a glossiness degree. Evaluation reference is as below.
- ◉: A glossiness degree was less than 1.5%. (extremely preferable low glossiness)
- ○: A glossiness degree was 1.5% or more but less than 2%. (preferable low glossiness)
- X: A glossiness degree was 2% or more. (glossiness not low enough)

—Reflectance—

Reflectance against a light having a wavelength of 550 nm (550 nm reflectance) on a surface of coating formed on each product was measured at 9 spots by using a spectral colorimeter (CM-5 produced by Konica Minolta Inc.) by the method based on JIS Z8722, and an average value thereof was adopted as reflectance. Evaluation reference is as below.
- ◉: Reflectance was 3% or less. (extremely preferable low reflectance)
- ○: Reflectance exceeds 3% but 4% or less. (preferable low reflectance)
- X: Reflectance exceeded 4%. (reflectance not low enough.)

—Blackness—

A degree of blackness on a surface of a coating formed on each product was evaluated by measuring lightness L*value in CIE 1976 L*a*b* (CIELAB) color space system on the surface by the SCE method. The lightness L*value was measured by using a spectral colorimeter (CM-5 produced by Konica Minolta Inc.) by the method based on JIS Z8781-4:2013. Evaluation reference is as below.

When measuring, a CIE standard light source D65 was used as a light source and L* value in the CIELAB color space system was obtained at a viewing angle of 10° by the SCE method. The CIE standard light source D65 is defined in JIS Z8720 (2000) "Standard Illuminants and Sources for Colorimetry", and ISO 10526 (2007) also shows the same definition. The CIE standard light source D65 is used in the case of displaying colors of an object illuminated by daylight. A viewing angle of 10° is defined in JIS Z8723 (2009) "Methods of Visual Comparison for Surface Colours", and ISO/DIS 3668 also shows the same definition.
- ◉: An L value was 20 or less. (extremely high degree of blackness)
- ○: An L value exceeded 20 but 22 or less. (high degree of blackness)
- X: An L value exceeds 22. (insufficient degree of blackness)

—Light-Shielding Characteristic—

A light-shielding characteristic of a coating formed on each product was evaluated by calculating optical density of the coating. Optical density of a coating formed on each product was obtained by using an optical density meter (X-rite 361T (ortho filter) produced by Nihon Heihan Kizai Kabushiki Kaisha), irradiating a vertical transmission light flux to the coated film side of a product, and calculating by expressing a ratio with respect to a state without a coating film in log (logarithms). Optical density of 6.0 or more is an upper limit value of detection in the measurement. Evaluation reference is as below. Note that this evaluation is on an assumption that an object to be coated itself has transmissivity and that a coating film formed thereon requires a light-shielding characteristic. When the coating film does not require any light-shielding characteristic, evaluation here does not affect its comprehensive evaluation.
- ◉: Optical density was 2 or more. (extremely preferable light-shielding characteristic)
- ○: Optical density was 1.5 or more but less than 2. (preferable light-shielding characteristic)
- X: Optical density was less than 1.5. (insufficient light-shielding characteristic)

—Adhesiveness—

Adhesiveness of a coating film formed on each product to a surface of an object to be coated was evaluated by cutting the coating film in a grid pattern with a market-available cutter, putting thereon a cellophane tape (Cellulose tape produced by NICHIBAN Co., Ltd.), then taking off the tape, and visually observing a remaining state of the coating film. Evaluation reference is as below.
- ◉: A coating film remained 100%. (extremely high adhesiveness)
- ○: A coating film remained 75% or more and less than 100%. (high adhesiveness)
- X: A coating film remained less than 75%. (insufficient adhesiveness)

—Comprehensive Evaluation—

Glossiness, reflectance, blackness degree and adhesiveness as above were evaluated comprehensively. Evaluation reference is as below. Note that a light-shielding characteristic was omitted from the comprehensive evaluation because, as explained above, it is required in some cases but not required in other cases.
- ◉: Evaluation on glossiness, evaluation on reflectance, evaluation on blackness degree and evaluation on adhesiveness were all ◉.
- ○: At least one of the evaluation on glossiness, evaluation on reflectance, evaluation on blackness degree and evaluation on adhesiveness was ○, and there is no X.
- X: At least one of the evaluation on glossiness, evaluation on reflectance, evaluation on blackness degree and evaluation on adhesiveness was X.

(3-6) Surface Properties
—Rz Value, Rsm Value, Rsk Value, Rku Value and Ra Value—

Properties (Rz value, Rsm value, Rsk value, Rku value and Ra value) of a surface of a coating film formed on each product was measured by using a surface roughness measuring device (SURFCOM 480B produced by TOKYO SEIMITSU Co., Ltd.) based on JIS B0601:2001. Evaluation reference is as below.

(Rz)
- ◉: Rz was 10 μm or more. (extremely preferable)
- ○: Rz was 7 μm or more but less than 10 μm. (preferable)
- X: Rz was less than 7 μm. (defective)

(Rsm)
- ◉: Rsm was 120 μm or more. (extremely preferable)
- ○: Rsm was 80 μm or more but less than 120 μm. (preferable)
- X: Rsm was less than 80 μm. (defective)

(Rsk)
- ◉: Rsk was 0.2 or less. (extremely preferable)
- ○: Rks exceeds 0.2 but 0.3 or less. (preferable)
- X: Rsk exceeds 0.3. (defective)

(Rku)
- ◉: Rku was 3.3 or more. (extremely preferable)
- ○: Rku was 3 or more but less than 3.3. (preferable)
- X: Rku was less than 3. (defective)

(Ra)
- ◉: Ra was 1.5 μm or more. (extremely preferable)
- ○: Ra was 0.5 μm or more but less than 1.5 μm. (preferable)
- X: Ra was less than 0.5 μm. (defective)

TABLE 1

| | | | COMPONENTS | | 1 | 2 | 3 | 4 | 5 | 6 | 7 | 8 | 9 |
|---|---|---|---|---|---|---|---|---|---|---|---|---|---|
| LIQUID COMPOSITION | A | A1 | | ACRYLIC RESIN | 60 | 60 | 60 | 60 | 60 | 60 | 60 | 60 | 60 |
| | D | D1 | | ISOCYANATE RESIN | 40 | 40 | 40 | 40 | 40 | 40 | 40 | 40 | 40 |
| | B | B1 | B1a | CARBON BLACK(150 nm) | 20.0 | 19.0 | 15.0 | 13.0 | 12.0 | 15.0 | 15.0 | 15.0 | 15.0 |
| | | | B1b | TRANSPARENT SILICA(58 nm) | — | — | — | — | — | — | — | — | — |
| | | B2 | B2a | COMPLEX SILICA(3 μm) | 35.0 | 36.0 | 40.0 | 42.0 | 43.0 | — | — | — | — |
| | | | B2b | BLACK ACRYLIC BEADS(3 μm) | — | — | — | — | — | 40.0 | — | — | — |
| | | | B2c | TRANSPARENT SILICA(4.1 μm) | — | — | — | — | — | — | — | 40.0 | — |
| | | | B2d | TRANSPARENT SILICA(8 μm) | — | — | — | — | — | — | — | — | 40.0 |
| | | | B2e | TRANSPARENT ACRYLIC BEADS(3 μm) | — | — | — | — | — | — | 40.0 | — | — |
| | | | | ※B1 : B2 = 1 : ● (MASS RATIO) | 1.75 | 1.89 | 2.67 | 3.23 | 3.58 | 2.67 | 2.67 | 2.67 | 2.67 |
| | | | | ※(A + B + D) : B = 100 : ● (MASS RATIO) | 35.5 | 35.5 | 35.5 | 35.5 | 35.5 | 35.5 | 35.5 | 35.5 | 35.5 |
| PROPERTY EVALUATION | LIQUID | | | VISCOSITY (mPa · s) | ○ | ○ | ○ | ○ | ○ | ○ | ○ | ○ | ○ |
| | | | | INJECTION PERFORMANCE | ○ | ○ | ○ | ○ | ○ | ○ | ○ | ○ | ○ |
| | | | | COATING PERFORMANCE | ○ | ○ | ○ | ○ | ○ | ○ | ○ | ○ | ○ |
| | | | | LIQUID DRIPPING PROPERTY | ○ | ○ | ○ | ○ | ○ | ○ | ○ | ○ | ○ |
| | MEMBRANE CHARACTERISTICS | | | GLOSSINESS (specular glossiness at 60°) | ○ | ○ | ◉ | ◉ | ◉ | ○ | ○ | ○ | ◉ |
| | | | | REFLECTANCE (550 nm REFLECTANCE) | ○ | ○ | ◉ | ◉ | ◉ | ○ | ○ | ○ | ○ |
| | | | | L VALUE(L*VALUE IN CIELAB COLOR SPACE SYSTEM) | X | ○ | ◉ | ◉ | ◉ | X | X | ○ | X |
| | | | | LIGHT-SHIELDING PROPERTY | ◉ | ◉ | ◉ | ○ | X | ◉ | X | ◉ | X |
| | | | | ADHESIVENESS | ◉ | ◉ | ◉ | ○ | ○ | X | ◉ | ◉ | X |
| | | | | ※COMPREHENSIVE EVALUATION | X | ○ | ◉ | ○ | X | X | X | ○ | X |
| | MEMBRANE SURFACE PROPERTIES | | | Rz | X | ○ | ◉ | ◉ | ◉ | ○ | ○ | ○ | ○ |
| | | | | Rsm | ○ | ○ | ◉ | ◉ | ◉ | ○ | ○ | ○ | ○ |
| | | | | Rsk | X | ○ | ○ | ○ | ○ | ○ | ○ | ○ | ○ |
| | | | | Rku | ◉ | ◉ | ◉ | ○ | ○ | ○ | ○ | ○ | ○ |
| | | | | Ra | ○ | ○ | ◉ | ◉ | ◉ | ○ | ○ | ○ | ○ |

| | | | COMPONENTS | | 10 | 11 | 12 | 13 | 14 | 3 | 15 | 16 | 17 |
|---|---|---|---|---|---|---|---|---|---|---|---|---|---|
| LIQUID COMPOSITION | A | A1 | | ACRYLIC RESIN | 60 | 60 | 60 | 60 | 60 | 60 | 60 | 60 | 60 |
| | D | D1 | | ISOCYANATE RESIN | 40 | 40 | 40 | 40 | 40 | 40 | 40 | 40 | 40 |
| | B | B1 | B1a | CARBON BLACK(150 nm) | — | 15.0 | — | 5.0 | 10.0 | 15.0 | 25.0 | 35.0 | 45.0 |
| | | | B1b | TRANSPARENT SILICA(58 nm) | 15.0 | 40.0 | 15.0 | — | — | — | — | — | — |
| | | B2 | B2a | COMPLEX SILICA(3 μm) | 40.0 | — | — | 16.0 | 19.0 | 40.0 | 62.0 | 80.0 | 120.0 |
| | | | B2b | BLACK ACRYLIC BEADS(3 μm) | — | — | 40.0 | — | — | — | — | — | — |
| | | | B2c | TRANSPARENT SILICA(4.1 μm) | — | — | — | — | — | — | — | — | — |
| | | | B2d | TRANSPARENT SILICA(8 μm) | — | — | — | — | — | — | — | — | — |
| | | | B2e | TRANSPARENT ACRYLIC BEADS(3 μm) | — | — | — | — | — | — | — | — | — |
| | | | | ※B1 : B2 = 1 : ● (MASS RATIO) | 2.67 | 2.67 | 2.67 | 3.20 | 1.90 | 2.67 | 2.48 | 2.29 | 2.67 |
| | | | | ※(A + B + D) : B = 100 : ● (MASS RATIO) | 35.5 | 35.5 | 35.5 | 17.4 | 22.5 | 35.5 | 46.5 | 53.5 | 62.3 |
| PROPERTY EVALUATION | LIQUID | | | VISCOSITY (mPa · s) | ○ | ○ | ○ | ○ | ○ | ○ | ○ | ○ | X |
| | | | | INJECTION PERFORMANCE | ○ | ○ | ○ | ○ | ○ | ○ | ○ | ○ | ○ |
| | | | | COATING PERFORMANCE | ○ | ○ | ○ | ○ | ○ | ○ | ○ | ○ | ○ |
| | | | | LIQUID DRIPPING PROPERTY | ○ | ○ | ○ | ○ | ○ | ○ | ○ | ○ | ○ |
| | MEMBRANE CHARACTERISTICS | | | GLOSSINESS (specular glossiness at 60°) | ○ | X | ○ | X | ○ | ◉ | ○ | ○ | ○ |
| | | | | REFLECTANCE (550 nm REFLECTANCE) | ○ | X | ○ | X | ○ | ◉ | ○ | ○ | ○ |
| | | | | L VALUE(L*VALUE IN CIELAB COLOR SPACE SYSTEM) | ○ | X | X | X | ○ | ◉ | ○ | ○ | ○ |

TABLE 1-continued

|  |  |  |  |  |  |  |  |  |  |  |
|---|---|---|---|---|---|---|---|---|---|---|
|  | LIGHT-SHIELDING PROPERTY | X | ○ | X | X | ○ | ◎ | ○ | ○ | ○ |
|  | ADHESIVENESS | ◎ | X | ○ | ◎ | ◎ | ◎ | ○ | ○ | X |
|  | COMPREHENSIVE EVALUATION | ○ | X | X | X | ○ | ◎ | ○ | ○ | X |
| MEMBRANE SURFACE PROPERTIES | Rz | ○ | X | ○ | X | ○ | ◎ | ◎ | ◎ | ◎ |
|  | Rsm | ○ | X | X | X | ○ | ◎ | ◎ | ◎ | ◎ |
|  | Rsk | ○ | X | X | X | ○ | ◎ | ◎ | ○ | ○ |
|  | Rku | ○ | X | X | X | ○ | ◎ | ◎ | ○ | ○ |
|  | Ra | ○ | X | ○ | X | ○ | ◎ | ◎ | ◎ | ◎ |

4. Consideration

As shown in Table 1 the Table of FIG. 1, when a liquid did not comprise as (B) one or more of (B1) and (B2) (Examples 6, 7, 9, 11 and 12), at least one of the membrane characteristics of glossiness, reflectance, L value and adhesiveness was not satisfied. On the other hand, even both of (B1) and (B2) were contained as (B) in the liquid (Examples 1 to 5, 8 and 10), when mass ratio of (B2) with respect to (B1):1 was less than 1.8 (Example 1) or exceeding 3.3 (Example 5), at least one of an L value and adhesiveness as membrane characteristics was not satisfied. Even if both of (B1) and (B2) are contained and a mass ratio of (B2) with respect to (B1):1 was in a proper range (1.8 or more and 3.3 or less) (Examples 2 to 4 and 13 to 17), when a content (total amount) of (B) in 100% by mass of a total solid content was less than 20% by mass (Example 13) or exceeding 70% by mass (Example 17), one or more of viscosity of a liquid and membrane characteristics of glossiness, reflectance, an L value and adhesiveness was not satisfied.

On the other hand, when a mass ratio of (B2) with respect to (B1):1 was 1.8 or more and 3.3 or less and a total content of (B) with respect to a total solid amount of 100% by mass in a composition was 20% by mass or more and 60% by mass or less (Examples 2 to 4, 8, 10 and 14 to 16), viscosity, injection performance, coating performance and a liquid dripping characteristic of the liquid, membrane characteristics, and membrane properties were all satisfied.

On the other hand, when a mass ratio of (B2) with respect to (B1):1 was 1.8 or more and 3.3 or less and a total content of (B) with respect to a total solid amount of 100% by mass in a composition was 20% by mass or more and 60% by mass or less (Examples 2 to 4, 8, 10 and 14 to 16), viscosity, injection performance, coating performance and a liquid dripping characteristic of the liquid, membrane characteristics, and membrane properties were all satisfied.

The invention claimed is:

1. A liquid composition for forming a membrane by spray coating, consisting of (A), (B), (C), and (D), wherein
   (A) is a resin component including a thermosetting resin;
   (B) is inorganic-type particles;
   (B) is contained in an amount of 20% by mass or more and 60% by mass or less in a total amount of 100% by mass of all solid content in the liquid composition;
   (B) consists of (B1) and (B2), wherein a total amount of (B1) and (B2) in 100% by mass of (B) is 100% by mass, and a mass ratio of (B2) with respect to (B1) is 1.8 or more and 3.3 or less;
   (B1) is inorganic-type small particles having a particle diameter (d1) of 0.05 μm or more and 0.4 μm or less;
   (B2) is inorganic-type large particles having a particle diameter (d2) of 3 μm or more and 6 μm or less;
   (B2) is a composite silica obtained by synthesizing carbon black and silica particles;
   (C) is a diluent solvent; and
   (D) is a curing agent of the thermosetting resin.

2. The composition according to claim 1, wherein (B1) comprises carbon black.

3. The composition according to claim 1, wherein a viscosity of the composition at 25° C. is 1mPa·s or more and 30mPa·s or less.

4. The composition according to claim 1, wherein the particles of (B2) have a particle distribution having a coefficient of variation value of 15 or less.

5. A membrane by spray coating formed from the composition according to claim 1.

6. A product provided with the membrane according to claim 5.

7. The product according to claim 6, wherein an outermost surface of a plane formed with the membrane has a glossiness of less than 2% against an incident light with an incident angle of 60° and a reflectance of 4% or less a ga insta light having a wavelength of 550 nm and an L value of 22 or less in the CIE 1976 L*a*b* (CIELAB) color space system by the SCE method defined in JIS Z8722 (2009).

8. The product according to claim 7, wherein the outermost surface of the plane formed with the membrane has an optical density of 1.5 or more when a light-shielding characteristic is required when transmitting a light to the membrane.

9. The product according to claim 8, wherein, on the outermost surface of the plane formed with the membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

10. The product according to claim 6, wherein, on an outermost surface of a plane formed with the membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

11. The product according to claim 7, wherein, on the outermost surface of the plane formed with the membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

* * * * *